US006247216B1

(12) United States Patent
Rader, Jr.

(10) Patent No.: US 6,247,216 B1
(45) Date of Patent: Jun. 19, 2001

(54) DEVICE FOR DISASSEMBLING A UNIVERSAL JOINT

(76) Inventor: Willard B. Rader, Jr., 3127 Upshur Northern Rd., Eaton, OH (US) 45320

( * ) Notice: Subject to any disclaimer, the term of this patent is extended or adjusted under 35 U.S.C. 154(b) by 0 days.

(21) Appl. No.: 09/470,750

(22) Filed: Dec. 23, 1999

(51) Int. Cl.[7] ....................................... B23P 19/02
(52) U.S. Cl. .............................................. 29/252
(58) Field of Search ............................. 29/251, 252, 258, 29/259, 260, 266, 281.1, 281.5, 898.07, 898.08

(56) References Cited

U.S. PATENT DOCUMENTS 3,429,021 * 2/1969 Spiess ................................... 29/252
3,786,544 * 1/1974 Ferguson ............................. 29/251
5,836,078 * 11/1998 Aiken ................................... 29/252

* cited by examiner

Primary Examiner—Robert C. Watson

(57) ABSTRACT

A device for disassembling a universal joint for removal of the connecting member of a universal joint with minimal effort. The device for disassembling a universal joint includes the universal joint having a generally cross shaped connecting member with two pairs of ends. Each of the ends has a cap thereon. The connecting member connects two arms. Each of the arms has an end that is U-shaped. Each portion of said U-shaped end has a bore therein for receiving an end of the connecting member. The device has a frame. The frame has a top wall, a bottom wall, a first side wall and a second side wall. A bore for insertion of a cap of the connecting member is in the second side wall. A pressing assembly urges the ends of the arms against the second side wall of the frame. The pressing assembly has a pump portion and an extendable arm such that the extendable arm extends away from the pump portion. The pump portion is mounted to an interior surface of the first side wall such that the extendable arm is extendable towards the second side wall.

15 Claims, 6 Drawing Sheets

DEVICE FOR DISASSEMBLING A UNIVERSAL JOINT

BACKGROUND OF THE INVENTION

1. Field of the Invention

The present invention relates to devices for disassembling u-joints and more particularly pertains to a new device for disassembling a universal joint for removal of the connecting member of a universal joint with minimal effort.

2. Description of the Prior Art

The use of devices for disassembling u-joints is known in the prior art. More specifically, devices for disassembling u-joints heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,050,285; U.S. Pat. No. 4,977,660; U.S. Pat. No. 3,230,617; U.S. Pat. No. 4,249,296; U.S. Pat. No. 3,786,544; and U.S. Pat. No. 4,343,075.

While these devices fulfill their respective, particular objectives and requirements, the aforementioned patents do not disclose a new device for disassembling a universal joint. The inventive device includes the universal joint having a generally cross shaped connecting member with two pairs of ends. Each of the ends has a cap thereon. The connecting member connects two arms. Each of the arms has an end that is U-shaped. Each portion of said U-shaped end has a bore therein for receiving an end of the connecting member. The device has a frame. The frame has a top wall, a bottom wall, a first side wall and a second side wall. A bore for insertion of a cap of the connecting member is in the second side wall. A pressing assembly urges the ends of the arms against the second side wall of the frame. The pressing assembly has a pump portion and an extendable arm such that the extendable arm extends away from the pump portion. The pump portion is mounted to an interior surface of the first side wall such that the extendable arm is extendable towards the second side wall.

In these respects, the device for disassembling a universal joint according to the present invention substantially departs from the conventional concepts and designs of the prior art, and in so doing provides an apparatus primarily developed for the purpose of removal of the connecting member of a universal joint with minimal effort.

SUMMARY OF THE INVENTION

In view of the foregoing disadvantages inherent in the known types of devices for disassembling u-joints now present in the prior art, the present invention provides a new device for disassembling a universal joint construction wherein the same can be utilized for removal of the connecting member of a universal joint with minimal effort.

The general purpose of the present invention, which will be described subsequently in greater detail, is to provide a new device for disassembling a universal joint apparatus and method which has many of the advantages of the devices for disassembling u-joints mentioned heretofore and many novel features that result in a new device for disassembling a universal joint which is not anticipated, rendered obvious, suggested, or even implied by any of the prior art devices for disassembling u-joints, either alone or in any combination thereof.

To attain this, the present invention generally comprises the universal joint having a generally cross shaped connecting member with two pairs of ends. Each of the ends has a cap thereon. The connecting member connects two arms. Each of the arms has an end that is U-shaped. Each portion of said U-shaped end has a bore therein for receiving an end of the connecting member. The device has a frame. The frame has a top wall, a bottom wall, a first side wall and a second side wall. A bore for insertion of a cap of the connecting member is in the second side wall. A pressing assembly urges the ends of the arms against the second side wall of the frame. The pressing assembly has a pump portion and an extendable arm such that the extendable arm extends away from the pump portion. The pump portion is mounted to an interior surface of the first side wall such that the extendable arm is extendable towards the second side wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new device for disassembling a universal joint apparatus and method which has many of the advantages of the devices for disassembling u-joints mentioned heretofore and many novel features that result in a new device for disassembling a universal joint which is not anticipated, rendered obvious, suggested, or even implied by any of the prior art devices for disassembling u-joints, either alone or in any combination thereof.

It is another object of the present invention to provide a new device for disassembling a universal joint which may be easily and efficiently manufactured and marketed.

It is a further object of the present invention to provide a new device for disassembling a universal joint which is of a durable and reliable construction.

An even further object of the present invention is to provide a new device for disassembling a universal joint which is susceptible of a low cost of manufacture with regard to both materials and labor, and which accordingly is then susceptible of low prices of sale to the consuming public, thereby making such device for disassembling a universal joint economically available to the buying public.

Still yet another object of the present invention is to provide a new device for disassembling a universal joint which provides in the apparatuses and methods of the prior art some of the advantages thereof, while simultaneously overcoming some of the disadvantages normally associated therewith.

Still another object of the present invention is to provide a new device for disassembling a universal joint for removal of the connecting member of a universal joint with minimal effort.

Yet another object of the present invention is to provide a new device for disassembling a universal joint which includes the universal joint having a generally cross shaped connecting member with two pairs of ends. Each of the ends has a cap thereon. The connecting member connects two arms. Each of the arms has an end that is U-shaped. Each portion of said U-shaped end has a bore therein for receiving an end of the connecting member. The device has a frame. The frame has a top wall, a bottom wall, a first side wall and a second side wall. A bore for insertion of a cap of the connecting member is in the second side wall. A pressing assembly urges the ends of the arms against the second side wall of the frame. The pressing assembly has a pump portion and an extendable arm such that the extendable arm extends away from the pump portion. The pump portion is mounted to an interior surface of the first side wall such that the extendable arm is extendable towards the second side wall.

Still yet another object of the present invention is to provide a new device for disassembling a universal joint that is mountable to a surface for greater support.

Even still another object of the present invention is to provide a new device for disassembling a universal joint that contains a plate to prevent the cap from ejecting from the joint and injuring the user of the device.

These to-ether with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
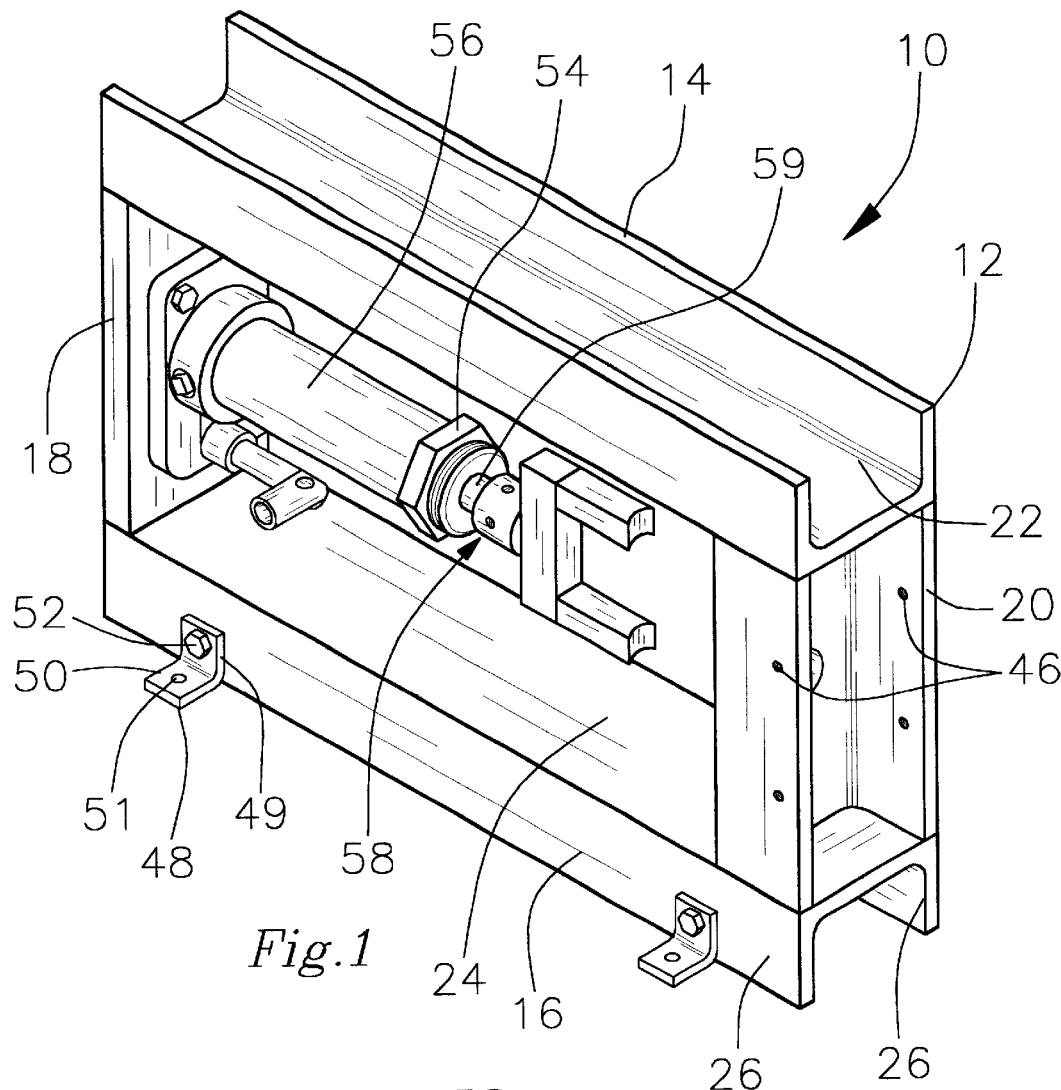
FIG. 1 is a schematic perspective view of a new device for disassembling a universal joint according, to the present invention.
Figure 2:
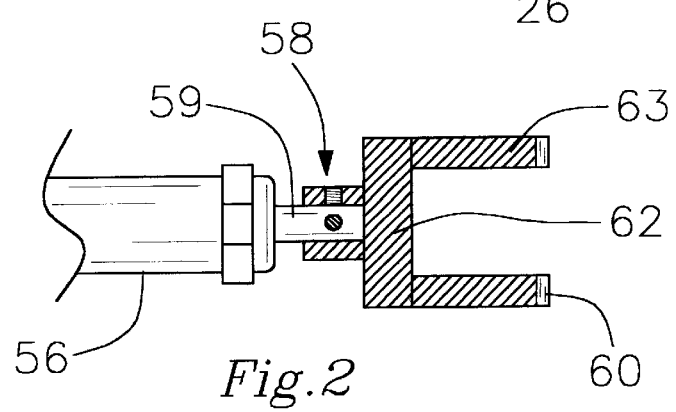
FIG. 2 is a schematic side view of the pressing assembly of the present invention.
Figure 3:
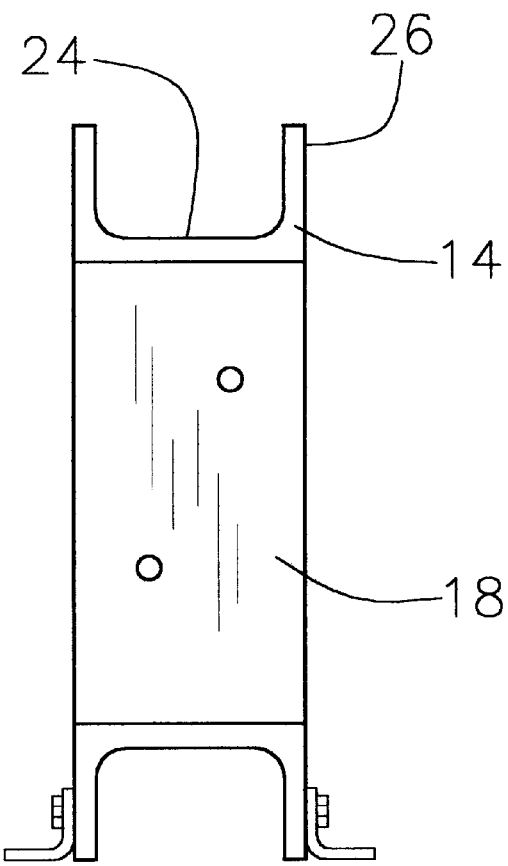
FIG. 3 is a schematic end view of the first wall of the present invention.
Figure 4:
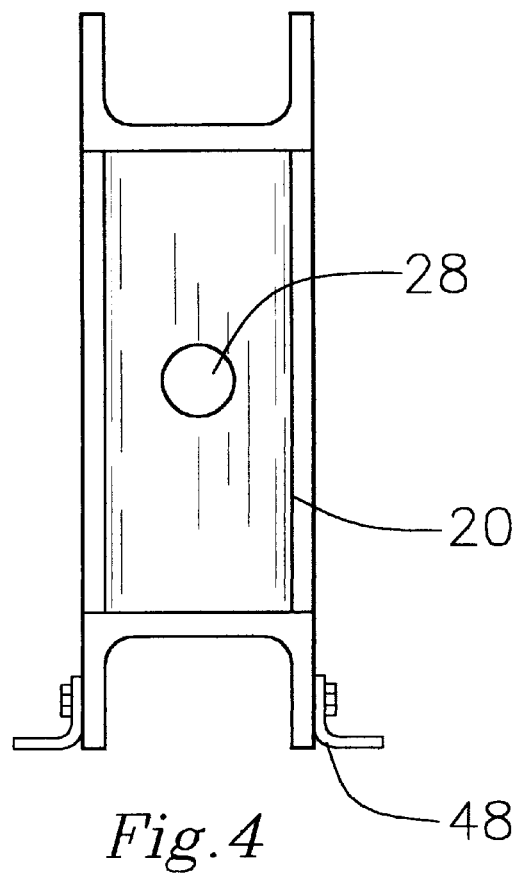
FIG. 4 is a schematic end view of the second wall of the present invention.
Figure 5:
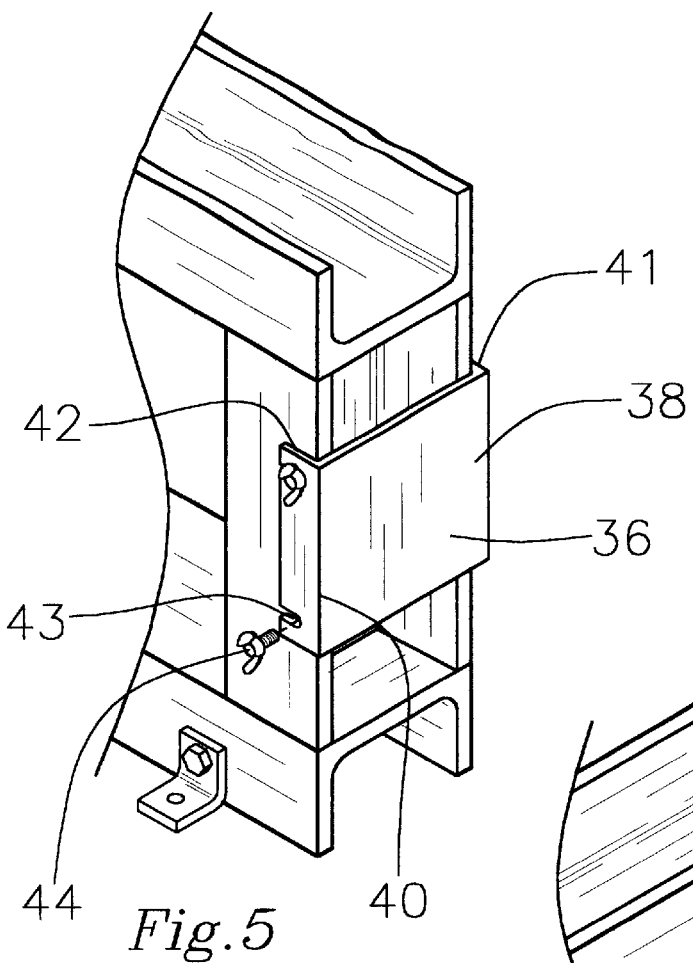
FIG. 5 is a schematic perspective view of the present invention.
Figure 6:
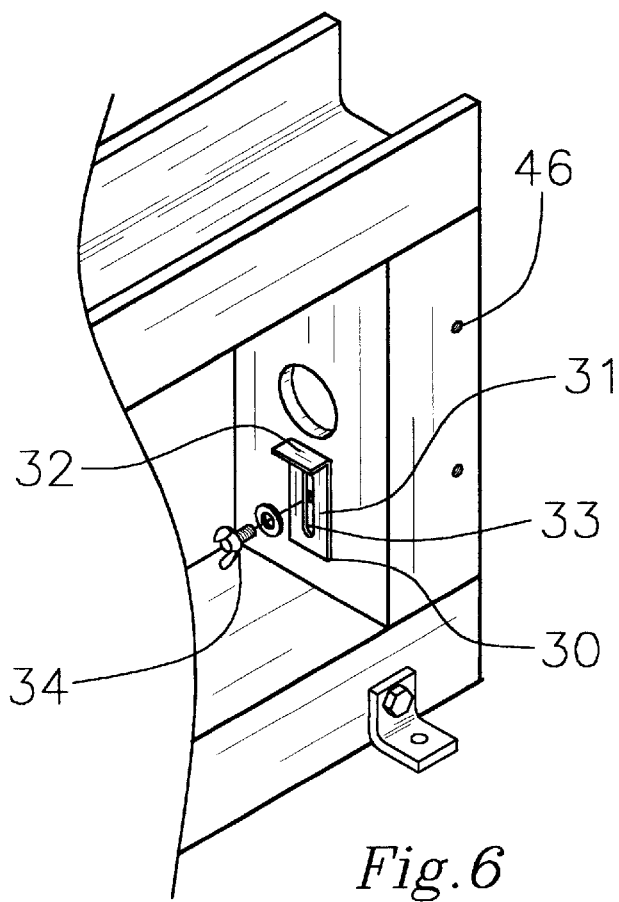
FIG. 6 is a schematic perspective view of the present invention.

With reference now to the drawings, and in particular to FIGS. 1 through 9 thereof, a new device for disassembling a universal joint embodying the principles and concepts of the present invention and generally designated by the reference numeral 10 will be described.

As best illustrated in FIGS. 1 through 9, the device for disassembling a universal joint 10 generally comprises a universal joint 70 having a generally cross shaped connecting member 72. The connecting member has two pairs of ends 73. Each of the ends has a cap, not shown, thereon. The connecting member 72 connects two arms 74. Each of the arms has a U-shaped end 76. Each portion of the U-shaped end has a bore 77 therein for receiving an end 73 of the connecting member 72.

The device comprises a frame 12. The frame has a top wall 14, a bottom wall 16, a first side wall 18 and a second side wall 20. The first 18 and second 20 side walls are opposing walls, and the top 14 and bottom 16 walls are opposing walls. Each of the top 14, bottom 16 and second side walls 20 has a generally U-shaped cross-section taken transverse to their respective longitudinal axis such that each U-shaped wall has an interior surface 22 directed away from an interior of the frame 12. Each U-shaped walls has a base portion 24 and two side portions 26 extending from the base portion 24.

A bore 28 for insertion of a cap of the connecting member 72 is in the second side wall 20. The bore 28 is in the base portion 24 of the second side wall 20. The bore 28 is located generally between the bottom wall 16 and the top wall 14.

A support bracket 30 for supporting the universal joint 70 is removably coupled to the second wall 20. The support bracket 30 is located on a surface of the second wall 20 generally between the first 18 and second 20 walls. The support bracket 30 is generally L-shaped having a long leg 31 and short leg 32. The long leg 31 has a slot 33 therein for receiving a fastening means 34 to attach the long leg 31 to the second wall 20.

A plate 36 limits the projection of a cap into the bore 28 and protects the user from the cap when it is pressed of. The plate 36 has two opposite edges 38, 40. The plate 36 has a bend therein defining two portions 41, 42 adjacent to the opposite edges 38, 40. Each of the portions 41, 42 extends away from one of the edges 38, 40. The portions 41, 42 are orientated generally parallel to each other. A distance between the edges 38, 40 of the plate 36 is approximately equal to a distance between the side portions 26 of the second side wall 20. The edges 38, 40 of the plate 36 each have a pair of spaced slots 43 therein.

A plurality of fastening means 44 fasten the plate 36 to the second side wall 20. Preferably, the fastening means 44 are hand screws.

Two pairs of bores 46 in the second side wall 20 releasably receive the fastening means 44. Each pair of the bores 46 is in one of the side portions 26 of the second side wall 20 such that one of pair of the bores is generally coaxial with the other pair of the bores. The bores 46 are spaced and located to become aligned with the slots 43 in the plate 36 such when the plate 36 is placed on the second side wall 20.

A plurality of brackets 48 releasably secure the frame 12 to a surface. The brackets 48 each have a first portion 49 and a second portion 50. Each of the first portions 49 are oriented generally perpendicular to the second portions 50. Each of the first 49 and second 50 portions has bore 51 therein. A plurality of securing means 52 is insertable in one of the bores 51 in the first portions 49 and into a bore, not shown, in the bottom wall 16. The securing means 52 is ideally a bolt. A plurality of bolts may be inserted through the bores 51 in the second portions 50 and into the surface.

A pressing assembly 54 urges the ends of the arms 74 against the second side wall 20 of the frame 12. The pressing assembly 54 has a cylinder portion 56 and an extendable arm 58 such that the extendable arm 58 extends away from the cylinder portion 56. The cylinder portion 56 is mounted to an interior surface of the first side wall 18 such that the extendable arm 58 is extendable towards the second side wall 20. The extendable arm 58 comprises a shaft portion 59 and claw portion 60. The shaft portion 59 is slidably mounted in the cylinder portion 56. The claw portion 60 has a cross bar 62 and two elongate members 63 attached thereto. The cross bar 62 is integrally coupled to the shaft portion 59. The cross bar 62 is oriented generally perpendicular to the shaft portion 59. Each of the elongate members 63 extends away from an end of the cross bar 62 towards the second side wall 20. The elongate members 63 are spaced such that the elongate members 63 may abut against the U-shaped members 76 of the arms 74 of the universal joint 70. The pressing assembly 54 is ideally a hydraulic jack.

Figure 7:
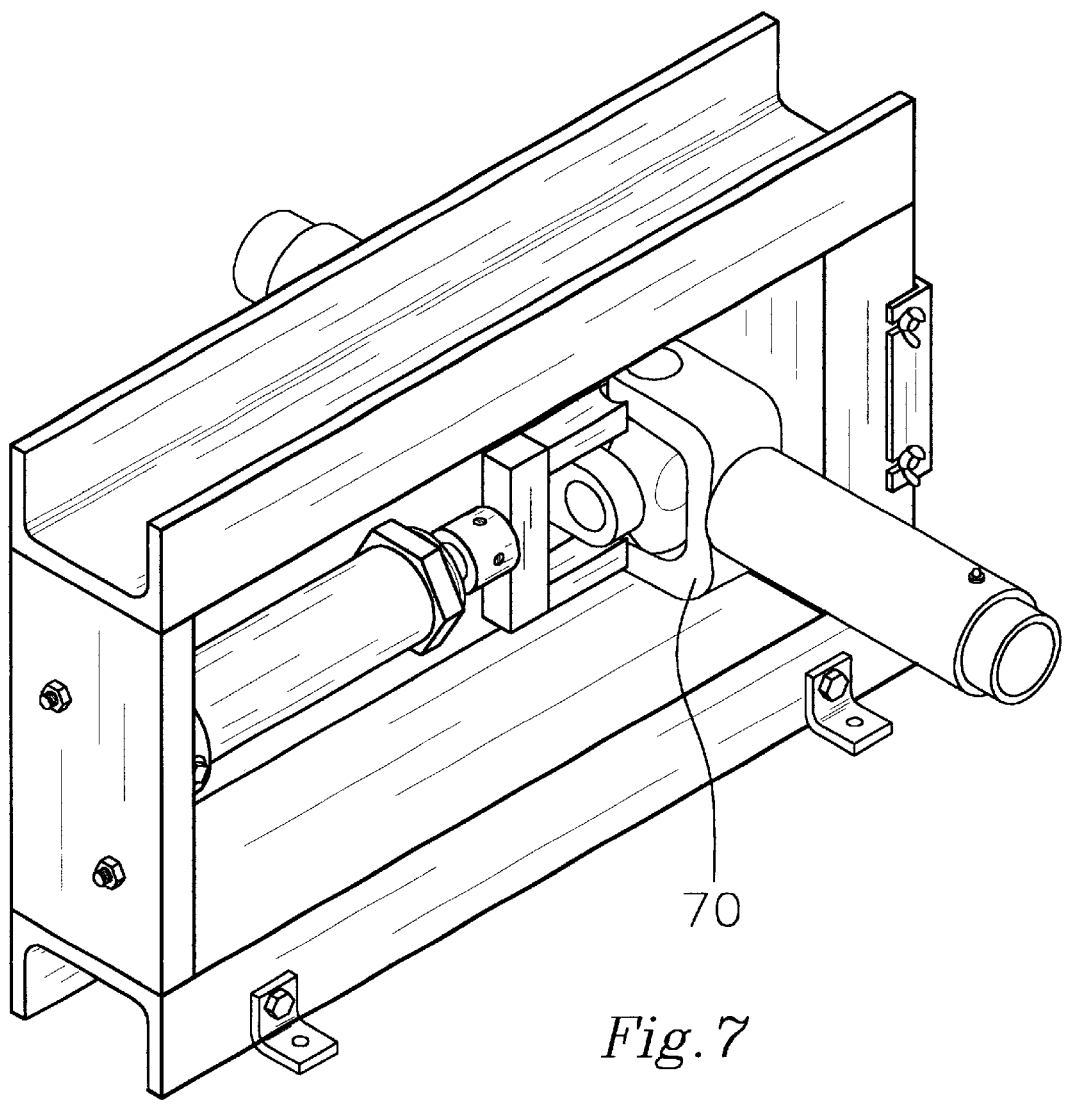
FIG. 7 is a schematic perspective view of the universal joint in the present invention.
Figure 8:
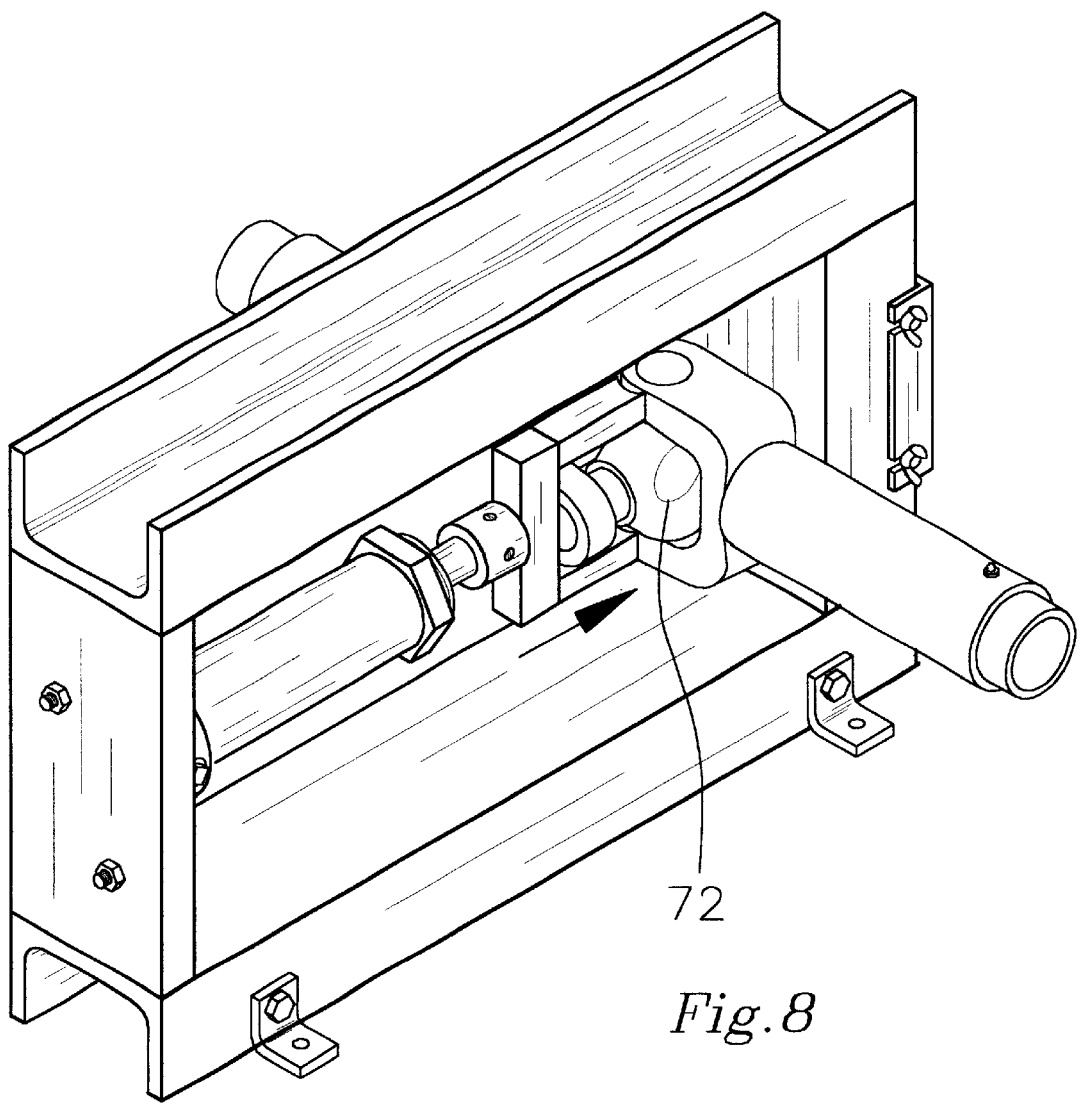
FIG. 8 is a schematic perspective view of the universal joint being pressed against the second wall of the present invention.
Figure 9:
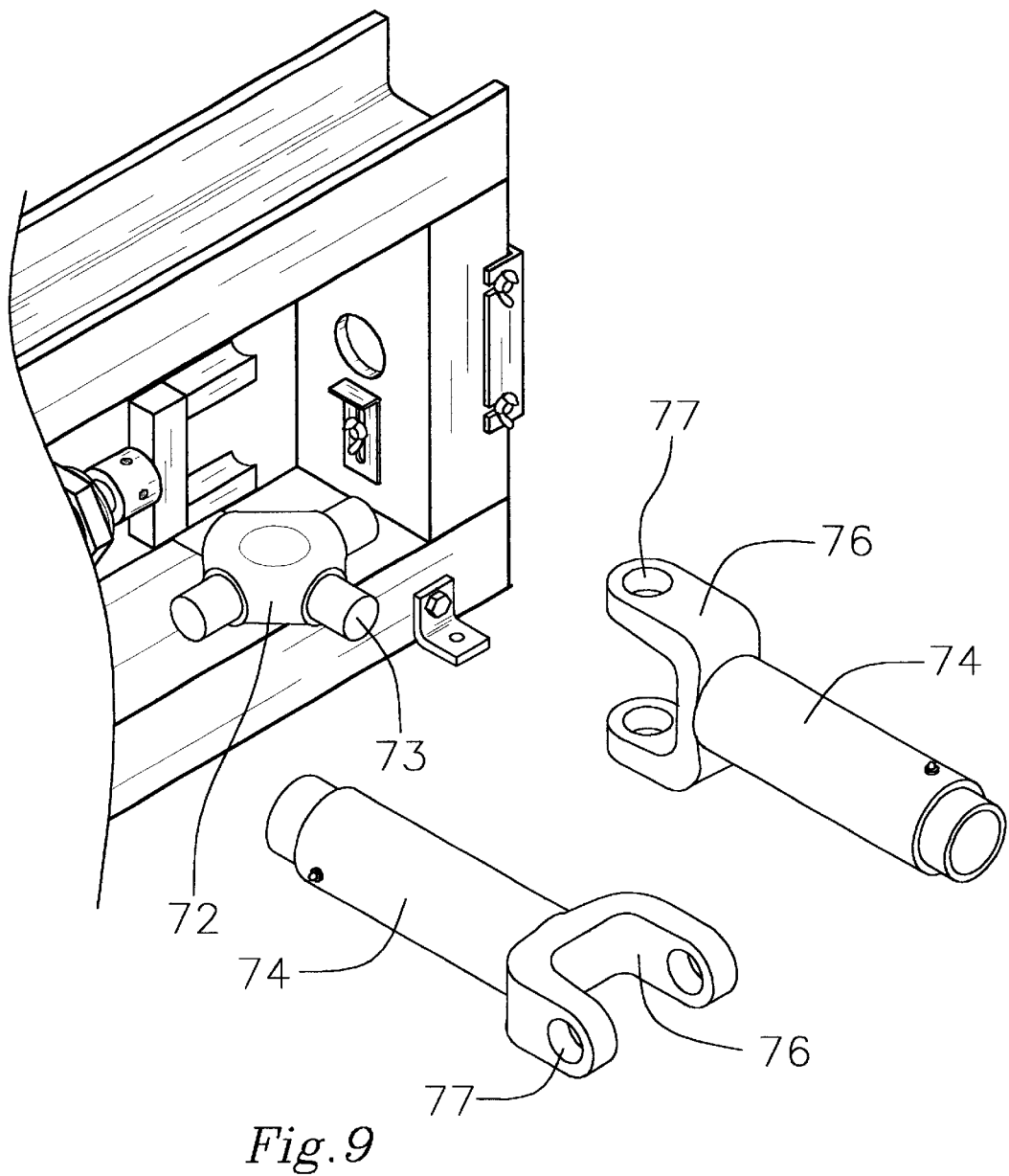
FIG. 9 is a schematic perspective view of the disassembled universal joint and the present invention.

In use, the cap of the connecting member 72 is placed in the bore 28 in the second wall 20. The pressing assembly 54 is engaged and the elongate members 63 press against the U-shaped ends 76 of the arms 74. The pressure forces the cap off. The universal joint is rotated to place all caps into the bore 28 until the arms 74 may be separated from the connecting member 72 as depicted in FIGS. 7 through 9.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for disassembly of a universal joint, the universal joint having a generally cross shaped connecting member having two pairs of ends, each of the ends having a cap thereon, the connecting member connecting two arms, each of the arms having an end being U-shaped, each portion of said U-shaped end having a bore therein for receiving an end of the connecting member, said device comprising:

a frame, said frame having a top wall, a bottom wall, a first side wall and a second side wall;

a bore for insertion of a cap of the connecting member, said bore being in said second side wall; and a pressing assembly for urging said ends of said arms against said second side wall of said frame, said pressing assembly having a pump portion and an extendable arm such that said extendable arm extends away from said pump portion, said pump portion being mounted to an interior surface of said first side wall such that said extendable arm is extendable towards said second side wall;

a support bracket for supporting the universal joint, said support bracket generally having an L-shape, said support bracket having a long leg and a short leg, said long leg having a slot therein, said long lcg being releasably secured to said second wall, said support bracket being located generally between said bore and said bottom wall.

2. The device for disassembly of a universal joint as in claim 1, wherein said frame comprises:

said first and second side walls being opposing walls, said top and bottom walls being opposing walls, each of said top, bottom and second side walls having a generally U-shaped cross-section taken transverse to their respective longitudinal axis such that each U-shaped wall has an interior surface directed away from an interior of said frame, each U-shaped wall having a base portion and two side portions extending from said base portion.

3. The device for disassembly of a universal joint as in claim 1, further comprising:

a plate for limiting the projection of a cap into said bore, said plate being releasably mounted to said second wall of said frame.

4. The device for disassembly of a universal joint as in claim 3, wherein said plate further comprises:

said plate having two opposite edges, said plate having a bend therein defining two portions adjacent to said opposite edges, each of said portions extending away from one of said edges, said portions being orientated generally parallel to each other, a distance between said edges of said plate being approximately equal to a distance between said side portions of said second side wall, said edges of said plate each having a pair of spaced slots therein.

5. The device for disassembly of a universal joint as in claim 4, further comprising:

a plurality of fastening means for fastening said plate to said second side wall, said fastening means being hand screws; and two pairs of bores in said second side wall for releasably receiving said fastening means, each pair of said bores being in one of said side portions of said side walls such that one of pair of said bores is generally coaxial with the other pair of said bores, said bores being spaced, said bores being located to become aligned with said slots in said plate such when said plate is placed on said second side wall.

6. The device for disassembly of a universal joint as in claim 1, further comprising:

a plurality of brackets for releasably securing said frame to a surface.

7. The device for disassembly of a universal joint as in claim 6, wherein said brackets comprise:

said brackets each having a first portion and a second portion, each of said first portions being oriented generally perpendicular to said second portions, each of said first and second portions having bore therein, a plurality of securing means being insertable in one of said bores in said first portions and into a bore in said bottom wall.

8. The device for disassembly of a universal joint as in claim 2, wherein said pressing assembly comprises:

said extendable arm comprising a shaft portion and claw portion, said shaft portion being slidably mounted in said pump portion, said claw portion having a cross bar and two elongate members attached thereto, said cross bar being integrally coupled to said shaft portion, said cross bar being oriented generally perpendicular to said shaft portion, each of said elongate members extending away from an end of said cross bar towards said second side wall.

9. The device for disassembly of a universal joint as in claim 8, wherein said pressing assembly comprises:

said elongate members being spaced such that said elongate members may abut against the U-shaped members of the arms of the universal joint.

10. A device for disassembly of a universal joint, the universal joint having a generally cross shaped connecting member having two pairs of ends, each of the ends having a cap thereon, the connecting member connecting two arms, each of the arms having an end being U-shaped, each portion of said U-shaped end having a bore therein for receiving an end of the connecting member, said device comprising:

a frame having a top wall, a bottom wall, a first side wall and a second side wall;

a bore for insertion of a cap of the connecting member, said bore being in said second side wall; and a pressing assembly for urging said ends of said arms against said second side wall of said frame, said pressing assembly having a pump portion and an extendable arm such that said extendable arm extends away from said pump portion, said pump portion being mounted to an interior surface of said first side wall such that said extendable arm is extendable towards said second side wall, said extendable arm comprises a shaft portion and claw portion, said shaft portion being slidably mounted on said pump portion, said claw portion having a cross bar and two elongate members attached thereto, said cross bar being Coupled to said shaft portion, said cross bar being oriented generally perpendicular to said shaft portion, each of said elongate members extending away from an end of said cross bar towards said second side wall.

11. The device for disassembly of a universal joint as in claim 10, wherein said elongate members are spaced such that said elongate members may abut against the U-shaped members of the arms of the universal joint.

12. The device for disassembly of a universal joint as in claim 10, wherein said first and second side walls are opposing walls, said top and bottom walls being opposing walls, each of said top, bottom and second side walls having a generally U-shaped cross-section taken transverse to their respective longitudinal axis such that each U-shaped wall has an interior surface directed away from an interior of said frame, each U-shaped wall having a base portion and two side portions extending from said base portion.

13. A device for disassembly of a universal joint, the universal joint having a generally cross shaped connecting member having two pairs of ends, each of the ends having a cap thereon, the connecting member connecting two arms, each of the arms having an end being U-shaped, each portion of said U-shaped end having a bore therein for receiving an end of the connecting member, said device comprising:

a frame having a top wall, a bottom wall, a first side wall and a second side wall;

a bore for insertion of a cap of the connecting member, said bore being in said second side wall; and a pressing assembly for urging said ends of said arms against said second side wall of said frame, said pressing assembly having a pump portion and an extendable arm such that said extendable arm extends away from said pump portion, said pump portion being mounted to an interior surface of said first side wall such that said extendable arm is extendable towards said second side wall;

wherein said frame comprises said first and second side walls being opposing walls, said top and bottom walls being opposing walls, each of said top, bottom and second side walls having a generally U-shaped cross-section taken transverse to their respective longitudinal axis such that each U-shaped wall has an interior surface directed away from an interior of said frame, each U-shaped wall having a base portion and two side portions extending from said base portion.

14. The device for disassembly of a universal joint as in claim 13, further comprising a plate for limiting the projection of a cap into said bore, said plate being releasably mounted to said second wall of said frame.

15. The device for disassembly of a universal joint as in claim 14, wherein said plate has two opposite edges, said plate having a bend therein defining two portions adjacent to said opposite edges, each of said portions extending away from one of said edges, said portions being orientated generally parallel to each other, a distance between said edges of said plate being approximately equal to a distance between said side portions of said second side wall, said edges of said plate each having a pair of spaced slots therein.

\* \* \* \* \*